Aug. 15, 1950      H. L. COOK      2,518,524
OPTICAL MEASURING DEVICE
Filed July 24, 1944
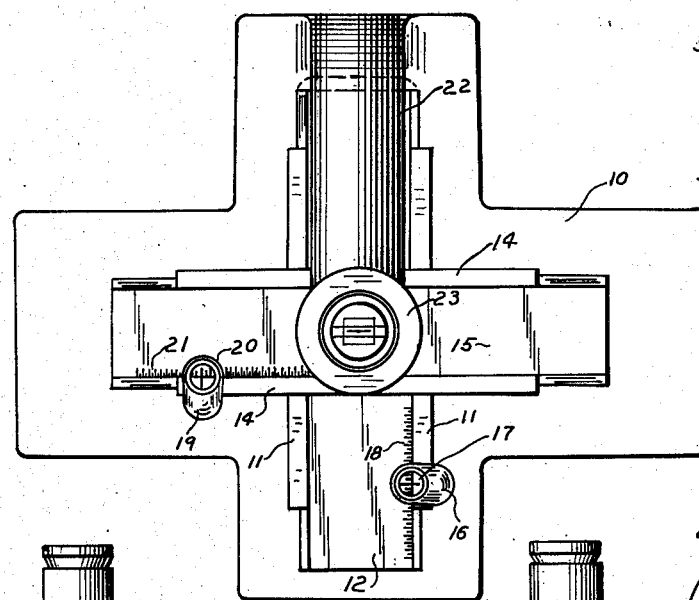
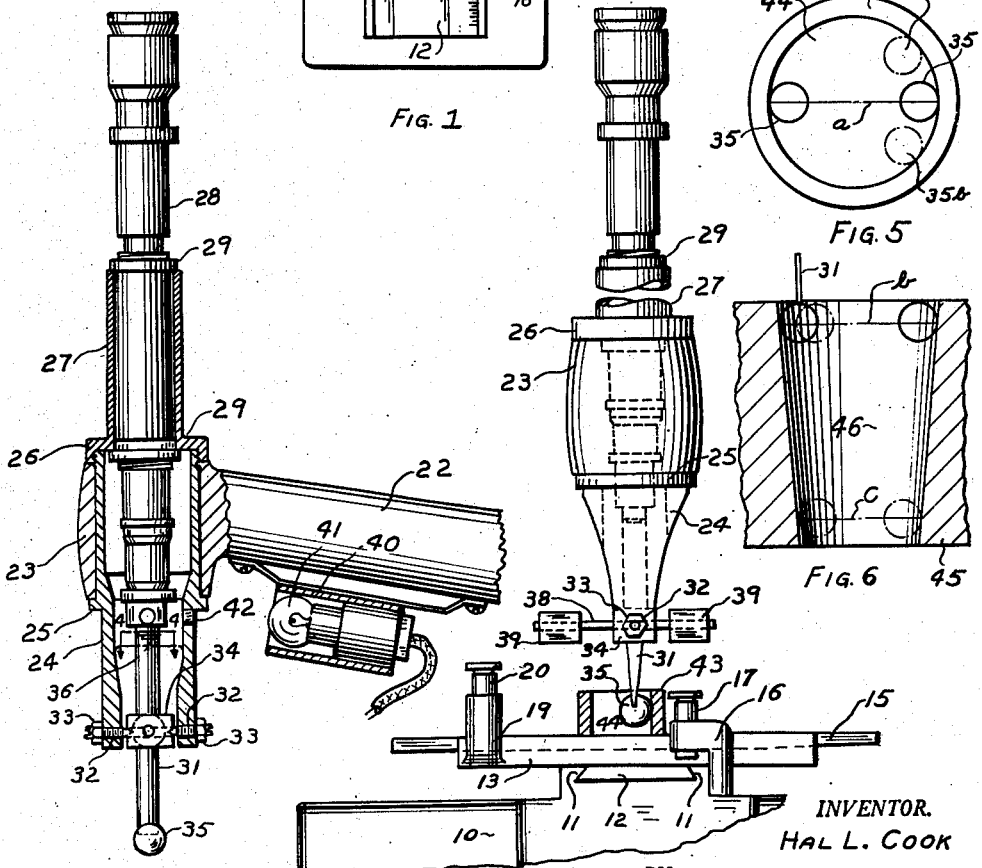
INVENTOR.
HAL L. COOK
BY
*Kurts Hudson Boughton & Williams*
ATTORNEYS Patented Aug. 15, 1950

2,518,524

UNITED STATES PATENT OFFICE 2,518,524

OPTICAL MEASURING DEVICE

Hal L. Cook, Cleveland Heights, Ohio, assignor to The Warner & Swasey Company, Cleveland, Ohio, a corporation of Ohio Application July 24, 1944, Serial No. 546,287

1 Claim. (Cl. 33—172)

This invention relates to a method of and device for measuring or testing surfaces or dimensions of articles.

An object of the invention is to provide an improved method of and device for accurately testing flat, curved, tapered or other surfaces or for measuring the distance between such surfaces in an improved, expeditious, simple and novel manner.

Another object is to provide an optical measuring or testing device which can measure or test cylindrical or tapered holes or bores or tapered surfaces or angularly disposed surfaces or other surfaces in an improved and novel manner.

Another object is to provide an optical measuring device as above specified and which device may form the basis of a special instrument or it may be embodied readily in or added to existing and well known commercial measuring instruments to thereby increase the number of measuring uses of such instruments or to improve the manner of carrying out their already existing measuring uses.

Another object is to provide an optical measuring device such as hereinbefore specified and which is simple in construction, is easy to operate or manipulate, is accurate, is composed of few parts and which parts are not subject to wear and hence will have long life.

Further and additional objects and advantages not hereinbefore referred to will become apparent hereinafter during the detailed description of an embodiment of the invention which is to follow.

Referring to the accompanying drawings,

Fig. 1 is a top plan view of a measuring or testing instrument or machine which includes an optical measuring or testing device embodying the present invention.

Fig. 2 is a front elevational view of the instrument shown in Fig. 1 and is taken looking from the lower side of Fig. 1, the work piece that is being measured being shown in section.

Fig. 3 is a detached view of the optical measuring or testing device per se, partly in side elevation and partly in section.

Fig. 4 is a diagrammatic plan view of the target of the optical measuring or testing device showing the fine microscope line of the target centered between the parallel reticule lines of the microscope, said view being taken approximately on line 4—4 of Fig. 3.

Fig. 5 is a diagrammatic illustration of the manner in which the optical measuring device may be used to measure the diameters of circular holes or bores.

Fig. 6 is a diagrammatic illustration of the manner in which the optical measuring device may be used to measure the taper and the varying diameters of tapered holes or bores, and Fig. 7 is a diagrammatic illustration of the use of the device in the measuring of the taper of a tapered surface.

The optical measuring device embodying the invention may be included in an instrument specially designed and built for it or it may be incorporated readily into an existing commercial measuring instrument, and in such latter event it will increase the limited number of uses formerly provided by the instrument and make such instrument a universal one. As illustrative of the commercial measuring instruments into which the device may be incorporated reference is made to well known optical measuring machines for determining the angles and pitches of threads, for checking master gauges and for other similar functions.

Referring to Figs. 1 to 3 inclusive, the optical measuring device embodying the invention is shown utilized in a measuring instrument which includes a bed 10 of substantially cross-like shape and provided with spaced parallel ways 11 running from adjacent the front of the bed (the lower side as viewed in Fig. 1) toward the rear thereof. A cross slide 12 is slidably supported by the bed 10 and guided by the ways 11 for movement forwardly or rearwardly of the instrument. The slide 12 may be moved in any desired manner, either directly by hand as illustrated or by well known manually operated mechanical means as will be well understood in the art. The slide 12 will frictionally maintain itself in any position of adjustment to which it is moved until its position is changed positively.

The cross slide 12 carries a base 13 which extends perpendicularly to the cross slide and projects laterally of each side thereof above the ways 11. The base 13 may be a separate member rigidly secured to the upper surface of the cross slide 12 or it may be formed integral with the cross slide. The base 13 is provided on its longitudinal edges with parallel guide ways 14. A longitudinal slide 15 is slidably supported on the base 13 and is guided by the ways 14 for movement longitudinally of the base 13 and the bed 10 (that is from right to left or vice versa, as viewed in Fig. 1). As in the case of the cross slide 12, the longitudinal slide 15 may be moved to different positions of adjustment directly by hand as shown, or it may be so moved by any well known manually operated mechanical means as will be well understood in the art. The longitudinal slide 15 will frictionally maintain itself in any position of adjustment to which it is moved until its position is changed positively.

The bed 10 is provided with an upstanding arm 16 which has a portion overlying the cross slide 12 and the right hand way 11, as viewed in the drawing, and said portion vertically supports a microscope 17 of well known construction. The cross slide 12 is provided with a scale 18 and the top of the adjacent way 11 with a cooperating master line and the scale and line can be read through the microscope 17 to determine the amplitude of movement which has been imparted to the cross slide either forwardly or rearwardly of the instrument.

Similarly, the base 13 is provided with an upstanding arm 19 which has a portion overhanging the front way 14 and the longitudinal slide 15 and which portion vertically supports a microscope 20 of well known construction. The microscope 20 is utilized in reading the relationship of the graduation lines of the scale 21 on the longitudinal slide with respect to the cooperating master line on the upper surface of the front way 14 to determine the distance of the movement given to the longitudinal slide longitudinally of the instrument.

The bed 10 adjacent its center rear edge is provided with an upstanding and forwardly extending bracket arm 22. Said arm 22 may be pivotally connected to the bed 10 so that it may be swung into or out of operative position or it may be formed integral with or rigidly secured to the bed as illustrated. The forward end of the bracket arm 22 is provided with a cylindrical vertically extending sleeve-like supporting portion 23. The portion 23 is so disposed that its longitudinal center line passes through the central point of the bed 10 as clearly shown and for a reason which soon will manifest itself.

A sleeve 24 interfits and extends downwardly below the portion 23 and has an external flange 25 which engages the lower end of said portion. The sleeve 24 has its right and left hand sides as viewed in Fig. 2 curved downwardly and inwardly toward each other and said sides of the sleeve adjacent the lower end thereof are cut away to provide openings in the sides for a purpose later to be explained. The sleeve 24 projects slightly above the upper end of the portion 23 and is externally threaded to screw into the internally threaded enlarged lower end 26 of a reduced upwardly extending sleeve 27, such enlarged lower end 26 engaging the upper end of the portion 23 of the bracket arm 22. It will be noted that the sleeves 24 and 27 are securely connected together and supported by the portion 23 of the bracket arm against any axial shifting movement of the sleeves.

A microscope 28 is secured in the sleeve 27 by means of clamping nuts 29 engaging the outer upper end and the inner lower end of the sleeve 27. The microscope 28 is of well known construction and hence its optics and other features need not be described in detail, but it should suffice to say that it extends vertically and has its lower or objective end located in the sleeve 24 below the portion 23 of the bracket arm 22. The microscope 28 is provided in its upper or ocular end with spaced parallel reticule lines, as will be understood in the art, and such lines are indicated at 30 in Fig. 4.

A lever or feeler 31 is pivotally or rockably mounted in the lower end of the sleeve 24 by means of centers carried by the sleeve and shown in the form of threaded steel pins 32 accurately axially aligned with each other and screwed through the sleeve 24 and locked in properly adjusted position by nuts 33. The pointed inner ends of the pins 32 engage in accurately located recesses formed on the opposite sides of an enlarged portion 34 of the lever 31 and which portion is located within the lower end of the sleeve 24 so that when the lever or feeler 31 rocks or swings on the axis of the pins 32 the openings formed in the lower end of the sleeve as previously described provide clearance for the movement of the portion 34. The feeler 31 extends downwardly below the portion 34 and has its narrow lower edge secured to a hard ball 35 of predetermined diameter, such as a steel ball or a ball formed of other hard wear resistant material. The lower end of the lever 31 is accurately disposed in a diametral plane through the ball 35. The lever 31 extends upwardly above the portion 34 to adjacent the lower end of the microscope 28 and the upper end of the lever is provided with a strip 36 of suitable material non-oxidizing in normal atmospheres, such as a palladium strip and on which is engraved or otherwise placed a fine microscopic line 37 (see Fig. 4), the purpose of which will later be pointed out.

The lever 31 is pivoted substantially midway between its upper end and the lowermost point of the ball 35 and hangs in a vertical position. The lever 31 may be biased from its normal vertical position by adjusting a slidable rod 38 which has secured to its opposite ends weights 39. The rod 38 is slidably mounted in the portion 34 of the lever 31 and extends through said portion at right angles to the pivotal axis of the lever.

The underside of the bracket arm 22 adjacent to the portion 23 has secured to it a light supporting fixture 40 in which is mounted an electric light 41, the light rays from which pass through an opening 42 in the sleeve 24 and illuminate the target strip 36 when a reading is being taken through the microscope 28.

It will be understood by those skilled in the art that suitable means may be provided, if desired, for adjusting the microscope 28 and lever 31 in unison in a vertical direction. This adjustment may be advantageous where the device is employed to measure the taper and varying diameters of a tapered bore. This adjustment feature may be included in the structure of the arm 22 or it may be embodied in the support for the microscope 28 and lever 31 in the portion 23 of the arm.

The manner in which the optical measuring or testing device embodying the invention may be used will be explained first in connection with the measuring of the diameter of a circular hole or cylindrical bore, with reference to Figs. 2, 4 and 5.

In Fig. 2 a work piece 43 in the form of a ring gauge is mounted on the longitudinal slide 15 in a position such that the feeler ball 35 extends into the bore 44 of the work piece or ring gauge. It will be understood that suitable means may be provided to secure the ring gauge in position on the slide 15. The weights 39 are adjusted to bias the feeler 31 and ball 35 toward the right as viewed in the drawing and then the slide 15 is manipulated to bring the ball 35 into the position indicated at 35a in Fig. 5, at which time it is contacting the arcuate surface of the bore on one side of the diameter to be measured and the lever or feeler has been moved from its biased position into vertical position so that the target line 37 is located midway between the reticule lines 30, a condition which can be observed by the operator through the microscope. The operator now moves the cross slide 12 forwardly and rearwardly to cause the ball 35 to move along and in contact with the surface of the bore, with the result that the feeler will rock from vertical position first into maximum biased position and then back toward vertical position. The operator observes through the microscope this biasing movement of the feeler and by observation and by manipulation of the cross slide 12 determines the point at which the feeler moves to maximum biased position, whereupon he ceases moving slide 12 since the ball 35 is located now in the vertical plane of the diameter to be measured. The operator then moves the longitudinal slide 15 toward the left to rock the feeler until the target line 37 is midway between the reticule lines 30 and at this time he knows that the feeler extends vertically and the ball is on the diameter line to be measured, as indicated by the full line position of Fig. 5. The operator takes a reading of the scale 21 through the microscope 20 and then adjusts the weights 39 to bias the feeler toward the left as viewed in the drawing. He then moves the longitudinal slide 15 toward the right until the ball 35 again contacts the surface of the bore at a point diametrically opposite to the point of its last contact with said surface and until the feeler is again in vertical position as indicated through the microscope by the target line and reticule lines. The operator then takes a second reading of the scale 21 through the microscope 20 and computes from the two readings of the scale 21 the distance that the slide 15 has moved toward the right. This distance plus the known diameter of the ball constitutes the actual measurement of the inside diameter of the ring gauge. If it is desired to measure the roundness of the bore a number of such diameter measurements may be taken by indexing the ring gauge and repeating the measuring operation.

Another way in which the diameter to be measured may be located is as follows: With the feeler ball in position 35a of Fig. 5, at which time it will be recalled the feeler extends vertically, the operator takes a reading of the scale 18 through the microscope 17 and then moves cross slide 12 to cause relative movement of the ball 35 from position 35a into position 35b where the feeler is again extending vertically as noted by observing the target line 37 and reticule lines 30 through the microscope 28.

The operator takes another reading of the scale 18 through the microscope 17 and thus determines the distance that the cross slide 12 has moved. He then moves the cross slide 12 in the opposite direction a distance equal to one-half of the distance of the previous movement and this places the ball 35 on the diameter line a to be measured as indicated by full lines of Fig. 5. After this has occurred the operator moves the longitudinal slide 15 toward the left as viewed in the drawing to bring the feeler out of biased position and into vertical position as indicated by the target line 37 and reticule lines 30. He may then proceed to measure the diameter as in the previously described method.

The varying diameters and the taper of a tapered bore may be measured also by the device. A work piece 45 having a tapered bore 46 is shown in Fig. 6. The diameter of the bore 46 may be measured at any desired number of points along the bore, two such points being indicated in Fig. 6. The diameter of the bore 46 may be measured along diameter line b of Fig. 6 in the same manner as has been described with respect to the measurement of the cylindrical bore 44 of the ring gauge. Then the work piece 45 may be raised vertically a predetermined distance by inserting between it and the slide 15 a gauge plate or plates of known thickness, and the diameter of the bore 46 again measured in the manner described but along the diameter line c of Fig. 6. Inasmuch as the axial distance between the lines b and c is known, the taper of the bore 46 may be readily computed. Of course, where the device embodies provision for vertical adjustment in unison of the microscope 28 and lever 31, the axial distance displacement between the lines b and c can be obtained and determined from the amplitude of such adjustment in place of using the gauge plate or plates previously mentioned.

In Fig. 7 the manner in which the device may be used for measuring the taper of external tapered surfaces is shown diagrammatically. The work piece 47, which may be a taper gauge having an external tapered surface 48, is placed on the slide 15 with the straight side of the gauge extending in a front and rear direction and parallel to the direction of movement of cross slide 12. The operator engages said tapered surface 48 with the ball 35 and then adjusts the longitudinal slide 15 until the target line 37 is centered between the reticule lines 30. This is the position of the ball indicated at 35c in Fig. 7. The operator reads the position of slide 15 through microscope 20 and then displaces the cross slide 12 a distance in the direction of the line d in Fig. 7 and determined by reading the scale 18 through the microscope 17, it being understood that the ball follows the tapered surface and the lever rocks to bring the target line out of center position with respect to the reticule lines 30. The operator then adjusts the position of the longitudinal slide 15 until the target line 37 is again centered with respect to the reticule lines 30 of the microscope 28 and the ball is in position 35d, whereupon he reads the position of the slide 15 through the microscope 20. This last reading compared with the first reading of the position of slide 15 gives the distance that the ball center has been displaced perpendicularly of line d toward the work piece 47 and since displacement distance d lengthwise of the work piece is known, the taper of the surface 48 may be readily computed. It will be understood that readings may be taken at more than two points if it is desired to do so, as for example, to test the straightness of the tapered surface.

From the foregoing description it will be seen that the optical measuring device adequately attains the objects and advantages previously set forth herein.

Although a preferred embodiment of the invention has been illustrated and described it will be understood that the invention is susceptible of various modifications and adaptations within the scope of the appended claim.

Having thus described my invention, I claim:

In combination with a measuring instrument having means for supporting the article to be measured and for moving said article determinable linear distances in directions perpendicular to each other during the measuring operation of the instrument, a measuring or testing device comprising a support operatively connected with said instrument and having a portion overlying said article, a microscope mounted in said portion, a lever pivotally connected with said portion and having one of its ends adjacent to the objective end of said microscope, said one end of said lever and said microscope being provided with cooperating means observable through the microscope and indicating when said lever is in longitudinally aligned position with respect to said microscope, the opposite end of said lever being provided with a feeler element of predetermined size, and adjustable counterweight means operatively associated with said lever and acting to selectively bias the same to one side or the other of said longitudinally aligned position to move said feeler element in one or the other direction.

HAL L. COOK.

REFERENCES CITED

The following references are of record in the file of this patent:

UNITED STATES PATENTS

| Number | Name | Date |
|---|---|---|
| 587,930 | Coffin | Aug. 10, 1897 |
| 1,357,813 | Olson | Nov. 2, 1920 |
| 1,467,403 | Toomey | Sept. 11, 1923 |
| 2,039,232 | Lindner | Apr. 28, 1936 |
| 2,098,838 | Tusnak | Nov. 9, 1937 |

FOREIGN PATENTS

| Number | Country | Date |
|---|---|---|
| 46,874 | Switzerland | Apr. 1, 1909 |